US010476049B2

(12) United States Patent
Schoenherr et al.

(10) Patent No.: US 10,476,049 B2
(45) Date of Patent: Nov. 12, 2019

(54) MECHANICALLY FASTENED THROUGH-WALL CURRENT COLLECTOR

(71) Applicant: Robert Bosch Battery Systems LLC, Orion, MI (US)

(72) Inventors: Robert Schoenherr, Oxford, MI (US); Mark Kotik, Rochester Hills, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 185 days.

(21) Appl. No.: 15/651,254

(22) Filed: Jul. 17, 2017

(65) Prior Publication Data
US 2019/0019998 A1 Jan. 17, 2019

(51) Int. Cl.
*H01M 2/06* (2006.01)
*H01M 2/10* (2006.01)
*H01M 2/30* (2006.01)
*H01M 10/04* (2006.01)
*H01M 2/02* (2006.01)
(Continued)

(52) U.S. Cl.
CPC ........... *H01M 2/06* (2013.01); *H01M 2/0275* (2013.01); *H01M 2/08* (2013.01); *H01M 2/1077* (2013.01); *H01M 2/30* (2013.01); *H01M 10/0413* (2013.01); *H01M 10/0525* (2013.01); *H01M 2220/20* (2013.01)

(58) Field of Classification Search
CPC ........ H01M 2/06; H01M 2/0275; H01M 2/08; H01M 2/1077; H01M 2/30; H01M 10/0413; H01M 10/0525; H01M 2220/20

USPC .......................................................... 429/179
See application file for complete search history.

(56) References Cited

U.S. PATENT DOCUMENTS 7,014,950 B2   2/2006   Ozawa et al.
9,379,371 B2   6/2016   Ahn et al.
(Continued)

FOREIGN PATENT DOCUMENTS

JP   5971254      4/1984
JP   H09-199173   7/1997
(Continued)

OTHER PUBLICATIONS

J-PlatPat Machine Translation of the detailed description of JP 09-199173A (Year: 1997).*
PCT International Search Report for PCT/EP2018/067660.

*Primary Examiner* — Gregg Cantelmo
(74) *Attorney, Agent, or Firm* — Kelly McGlashen; Maginot Moore & Beck LLP

(57) ABSTRACT

A pouch cell includes a generally rectangular cell housing formed of a metal laminated film, an electrode assembly that is sealed within the cell housing, and a current collector device disposed in the cell housing. The electrode assembly includes positive electrode portions alternating with negative electrode portions, the positive electrode portions and the negative electrode portions being separated by at least one separator and stacked along a stack axis. The current collector device is electrically connected to one of the positive electrode portions and the negative electrode portions and exits the cell housing via an opening formed in the cell housing. The opening is formed in a side wall of the cell housing at a location spaced apart from the sealed joint that closes the cell housing and at a location facing the stack axis.

20 Claims, 10 Drawing Sheets

(51) Int. Cl.
*H01M 2/08* (2006.01)
*H01M 10/0525* (2010.01)

(56) References Cited

U.S. PATENT DOCUMENTS

| | | | |
|---|---|---|---|
| 2004/0180260 A1* | 9/2004 | Somatomo | H01M 2/0426 429/174 |
| 2006/0115723 A1 | 6/2006 | Ando et al. | |
| 2010/0173194 A1 | 7/2010 | Fujiya et al. | |
| 2011/0129711 A1 | 6/2011 | Ahn et al. | |
| 2013/0011725 A1 | 1/2013 | Meehan et al. | |

FOREIGN PATENT DOCUMENTS

| | | |
|---|---|---|
| JP | H10-106516 | 4/1998 |
| JP | H11-345604 | 12/1999 |
| JP | 2002231197 | 8/2002 |
| JP | 2012084541 | 4/2012 |
| WO | 2017102420 | 6/2017 |

* cited by examiner

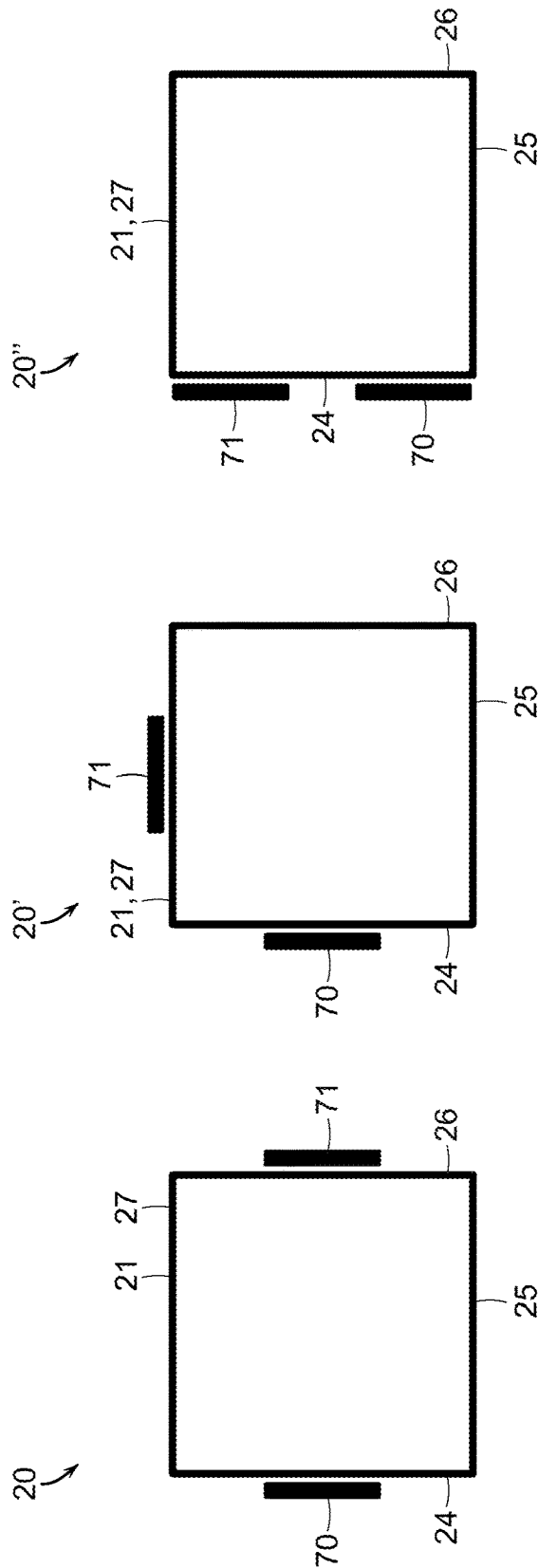

MECHANICALLY FASTENED THROUGH-WALL CURRENT COLLECTOR

BACKGROUND

The present invention relates to an electrochemical cell that includes a stacked or rolled arrangement of electrode plates, and a current collector device disposed in the cell that forms an electrical connection with the electrode plates within the cell and permits transfer of current out of the cell via an opening in the cell pouch housing.

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in two or three dimensional arrays and are electrically connected in series or in parallel. Likewise, the battery modules within a battery pack are electrically connected in series or in parallel.

Different cell types have emerged in order to deal with the space requirements of a very wide variety of installation situations, and the most common types used in automobiles are cylindrical cells, prismatic cells, and pouch cells. Regardless of cell type, each cell may include a cell housing and an electrode assembly disposed in the cell housing. The electrode assembly includes a series of stacked or rolled positive electrode plates that alternate with negative electrode plates and are separated by an intermediate separator plates. Each cell may also include a first current collector that is electrically connected to the positive electrode plates and joins the positive electrode plates to a positive cell terminal disposed outside the cell housing, and a second current collector that is electrically connected to the negative electrode plates and joins the negative electrode plates to a negative cell terminal disposed outside the cell housing.

In a pouch cell, the first and second current collectors typically each include a lead tab that passes out of the pouch between two stacked layers of pouch fabric and along a weld line that joins the layers of pouch fabric together and forms a sealed joint. The lead tab is used to pass current from inside the pouch cell housing to the outside where it can be electrically connected to an external structure such as a terminal. A special sealing tape is used to surround the lead tab at the sealed joint where the lead tab passes between the layers and out of the pouch. The sealing tape is relatively expensive since it is required to have very specific material properties. For example, the sealing tape is required to remain solid, tacky and pliable in all conditions except when localized heat is applied as occurs during the pouch fabric welding operation. When localized heat is applied, the sealing tape is required to melt, flow into open gaps between materials, and bond to both the pouch material and the respective lead tabs. A need exists for a relatively simple and less costly structure for passing current from inside the pouch cell housing to the outside where it can be electrically connected to an external structure such as a terminal or another cell.

SUMMARY

In some aspects, an electrochemical cell includes a cell housing, an electrode assembly disposed in the cell housing, and a current collector device. The cell housing is formed of a flexible sheet, and has a first housing portion, and a second housing portion that is joined to the first housing portion along a sealed joint to form a pouch. The first housing portion includes a base and a sidewall that protrudes from a perimeter of the base and surrounds the base to form an open-ended container. The electrode assembly includes positive electrode portions alternating with negative electrode portions. The positive electrode portions and the negative electrode portions are separated by at least one separator and stacked along a stack axis. The stack axis extends in a direction perpendicular to the base. The current collector device is electrically connected to one of the positive electrode portions and the negative electrode portions and exits the cell housing via an opening formed in the cell housing sidewall. The opening is disposed at a location spaced apart from the sealed joint and at a location facing the stack axis. The current collector device includes a current collecting plate that is disposed between the sidewall and the one of the positive electrode portions and the negative electrode portions. The current collecting plate is electrically connected to the one of the positive electrode portions and the negative electrode portions, is oriented parallel to the sidewall, and overlies the opening. The current collecting plate includes a protrusion that protrudes from a sidewall facing surface of the plate and extends through the opening, and a seal that surrounds the opening and is disposed between the sidewall and the current collecting plate. In addition, the current collector device includes a terminal plate that is oriented parallel to the sidewall, overlies the opening and is disposed outside the cell housing. The terminal plate includes a port that overlies the opening and receives the protrusion, and the port is configured to engage with the protrusion in such a way that the port of the terminal plate directly contacts the protrusion of the current collecting plate so as to form an electrical connection with the current collecting plate, and in such a way that the seal is compressed between the sidewall and the current collecting plate.

In some aspects, a battery pack includes electrochemical cells, each electrochemical cell including a cell housing, an electrode assembly disposed in the cell housing, and a current collector device. The cell housing is formed of a flexible sheet, and has a first housing portion, and a second housing portion that is joined to the first housing portion along a sealed joint to form a pouch. The first housing portion includes a base and a sidewall that protrudes from a perimeter of the base and surrounds the base to form an open-ended container. The electrode assembly includes positive electrode portions alternating with negative electrode portions, and the positive electrode portions and the negative electrode portions are separated by at least one separator and stacked along a stack axis. The stack axis extends in a direction perpendicular to the base. The current collector device is electrically connected to one of the positive electrode portions and the negative electrode portions and exits the cell housing, via an opening formed in the cell housing sidewall. The opening is disposed at a location spaced apart from the sealed joint and at a location facing the stack axis. The current collector device includes a current collecting plate that is disposed between the sidewall and the one of the positive electrode portions and the negative electrode portions. The current collecting plate is electrically connected to the one of the positive electrode portions and the negative electrode portions, is oriented parallel to the sidewall, and overlies the opening. The current collecting plate includes a protrusion that protrudes from a sidewall facing surface of the plate and extends through the opening, and a seal that surrounds the opening and is disposed between, the sidewall and the current collecting plate. The current collector device also includes a terminal plate that is oriented parallel to the sidewall, overlies the opening and is disposed outside the cell housing. The terminal plate includes a port that overlies the opening and receives the protrusion. The port is configured to engage with the protrusion in such a way that the port of the terminal plate directly contacts the protrusion of the current collecting plate so as to form an electrical connection with the current collecting plate, and in such a way that the seal is compressed between the sidewall and the current collecting plate. In addition, a portion of the current collector device of one of the electrochemical cells directly contacts and forms an electrical connection with a portion of a current collector device of an adjacent electrochemical cell within the battery pack.

The electrochemical cell and/or the battery pack may include one or more of the following features: The protrusion extends through the seal, the opening and the port, and a fastener is disposed on a terminal end of the protrusion in such a way as to retain the protrusion within the port. An outer surface of the protrusion is threaded, and the current collector device comprises a nut that is disposed on a terminal end of the protrusion, internal threads of the nut engaging with the threads on the protrusion outer surface, the nut cooperating with the protrusion in such a way as to generate a compression force on the seal. An outer surface of the protrusion has a shape and dimension that allows the protrusion to engage with the port in a press fit. A second current collector is electrically connected to another one of the positive electrode portions and the negative electrode portions and exits the cell housing via a second opening formed in the cell housing. The cell housing is rectangular including a first end, an opposed second end, and four sides that extend between the first end and the second end, and the first opening is formed in one of the four sides, and the second opening is formed in another of the four sides. The first opening is formed in one of the four sides, and the second opening is formed in a side opposed to the one of the four sides. The first opening is formed in one of the four sides, and the second opening is formed in a side adjacent to the one of the four sides. The first opening is formed in one of the four sides, and the second opening is formed in the same side. Each of the terminal plate and the current collecting plate comprise a first side and an opposed second side, and each of the first side and the second side is generally planar and free of surface features.

A pouch cell includes an electrode assembly that is sealed within a pouch-type, metal laminated film cell housing along with an electrolyte to form a power generation and storage unit. The electrode assembly may be a "stacked" electrode assembly that includes a series of stacked positive electrode plates alternating with negative electrode plates and separated by an intermediate separator plates. In addition, the pouch cell includes a current collector device that forms an electrical connection with a corresponding one of the electrode plates and allows passage of current generated in the electrode assembly to pass through the current collector and out of the cell while maintaining a hermetically sealed pouch cell housing.

Advantageously, the current collector device is disposed at a location that is spaced apart from the sealed joint used to form the pouch cell, and particularly at a location overlying an opening in the pouch sidewall, where the opening faces (lies in a plane parallel to) the stack axis of the electrode assembly. By forming the opening at this location rather than at the sealed joint, commonly available sealing materials can be used to prevent leakage about the current collector device, whereby the use of the relatively costly sealing tape can be eliminated and the cost to manufacture the cell is reduced.

Further advantageously, the current collector device may include a first element that is disposed inside the cell and a second element that is disposed outside the cell, and the first element is connected to the second element by a mechanical connection that both provides an electrical connection and applies a compression force in the vicinity of the opening. In some embodiments, a seal is provided between the second element and the housing that surrounds the opening, and the compression force serves to compress the seal, whereby air and moisture are prevented from entering the cell via the opening, and electrolyte is prevented from exiting the cell via the opening. The mechanical connection between the first and second elements provides a reliable, robust and pressure insensitive seal about the opening in the cell housing, and thus is an improvement as compared to some conventional pouch cell sealing techniques in which a hot melt seal is provided along a seal joint between portions of a pouch cell housing.

BRIEF DESCRIPTION OF THE DRAWINGS

FIG. 14 is a schematic top plan view of the cell of FIG. 2, in which a first current collector device is provided in an opening on one of the four sides of the cell, and a second current collector device is provided in an opening on a side opposed to the one of the four sides.

FIG. 15 is a schematic top plan view of an alternative embodiment cell, in which a first current collector device is provided in an opening on one of the four sides of the cell, and a second current collector device is provided in an opening on side adjacent to the one of the four sides.

FIG. 16 is a schematic top plan view of another alternative embodiment cell, in which a first current collector device is provided in an opening on one of the four sides of the cell, and a second current collector device is provided in an opening on the same side.

DETAILED DESCRIPTION

Figure 1:
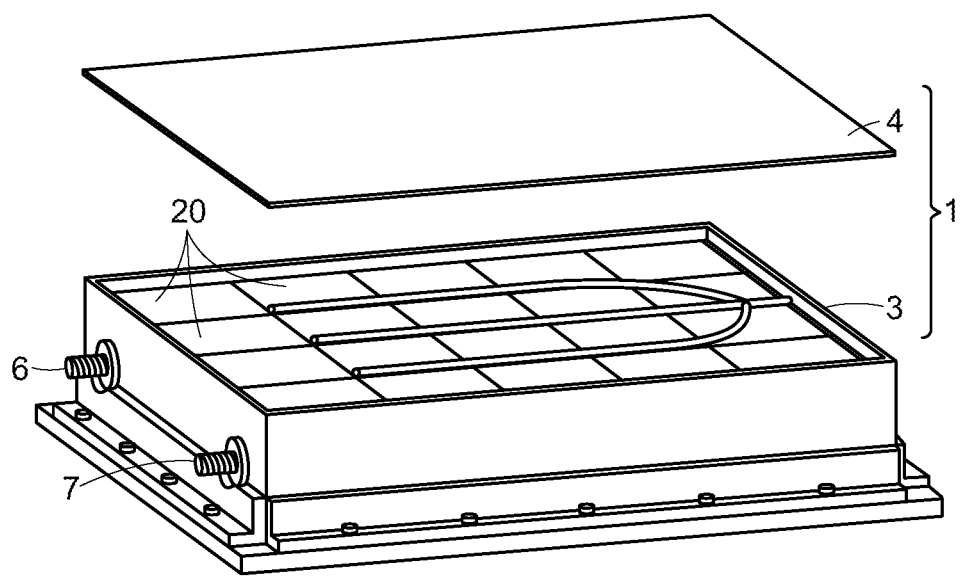
FIG. 1 is a partially exploded perspective view of a battery pack including an array of pouch cells.
Figure 2:
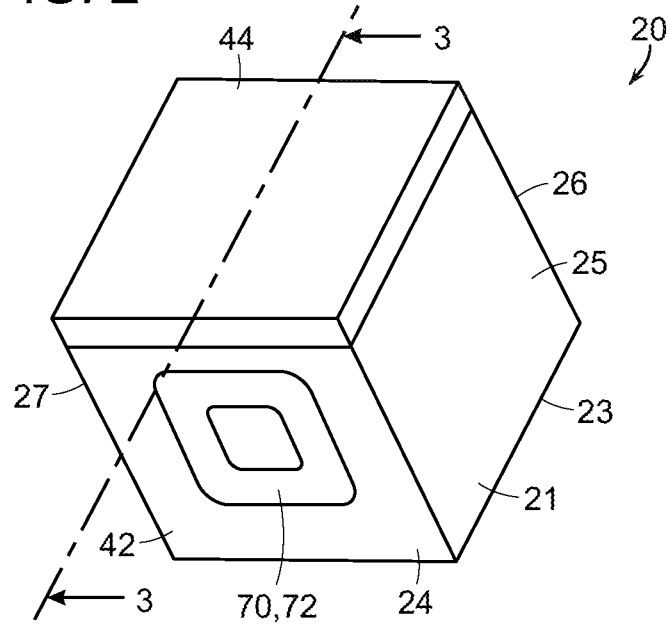
FIG. 2 is a perspective view of a pouch cell including the current collector devices.
Figure 3:
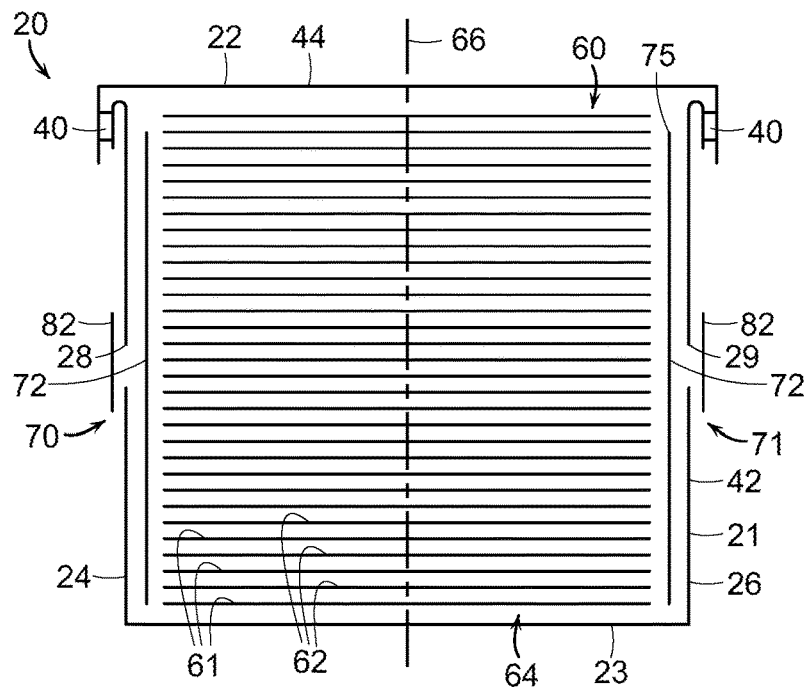
FIG. 3 is a schematic cross sectional view of the pouch cell of FIG. 2 as seen across line 3-3 of FIG. 2.

Referring to FIGS. 1-3, a battery pack 1 used to provide electrical power includes electrochemical cells 20 that are electrically interconnected and stored in an organized manner within a battery pack housing 2. The battery pack housing 2 includes a pack container portion 3 and a detachable pack lid 4. The cells 20 are lithium-ion pouch cells that include an electrode assembly 60 (FIGS. 3 and 4) that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery pack housing 2, the cells 20 are electrically connected in series or in parallel.

Each cell 20 includes a pouch-type cell housing 21. The cell housing 21 has a rectangular shape. In the illustrated embodiment, the cell housing 21 is cube shaped, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

The pouch-type cell housing 21 is an assembly of two blanks of a metal laminated polymer film sheet. Each blank is folded to form the shape of an open-ended box. The first blank corresponds to a relatively deep box that serves as a first cell housing portion or container 42 dimensioned to receive the electrode assembly 60. The container 42 includes a base corresponding to the cell housing second end 23, and a sidewall corresponding to the closed section defined by the cell housing sides 24, 25, 26, 27. The second blank corresponds to a relative shallow box that serves as a second housing portion or cover 44 that closes the open end of the container 42. The cover 44 corresponds to the cell housing first end 22, and is joined to each of the sides 24, 25, 26, 27 for example via welding. In particular, a continuous sealed joint 40 is formed along an intersection between the sides 24, 25, 26, 27 and the cell housing first end 22 to form a sealed rectangular pouch having a depth that is greater than the depth of some conventional pouch-type cell housings. For example, in some embodiments, the depth is greater than 20 mm. In the illustrated embodiment, the cell housing 21 is cube shaped and has length, width and height dimensions that are 90 mm or more.

The cell housing 21 includes openings 28, 29 formed in the cell housing sides 24, 26 that cooperate with a current collector devices 70, 71 to permit transfer of current out of the cell housing 21. The first opening 28 is formed in one of the sides, e.g. the first side 24, and the second opening 29 is formed in the opposed side, e.g. the third side 26. In addition, the first opening 28 and the second opening 29 are spaced apart from the sealed joint 40. For example, in the illustrated embodiment, the first opening 24 and the second opening 26 are each generally centered on the respective side 24, 26 whereas the sealed joint 40 adjoins the housing first end 22. By this arrangement, the first and second openings 28, 29 lie in a plane perpendicular to a plane defined by the cell housing second end 23 and thus face a stack axis 66 (discussed below) of the electrode assembly 60.

Figure 4:
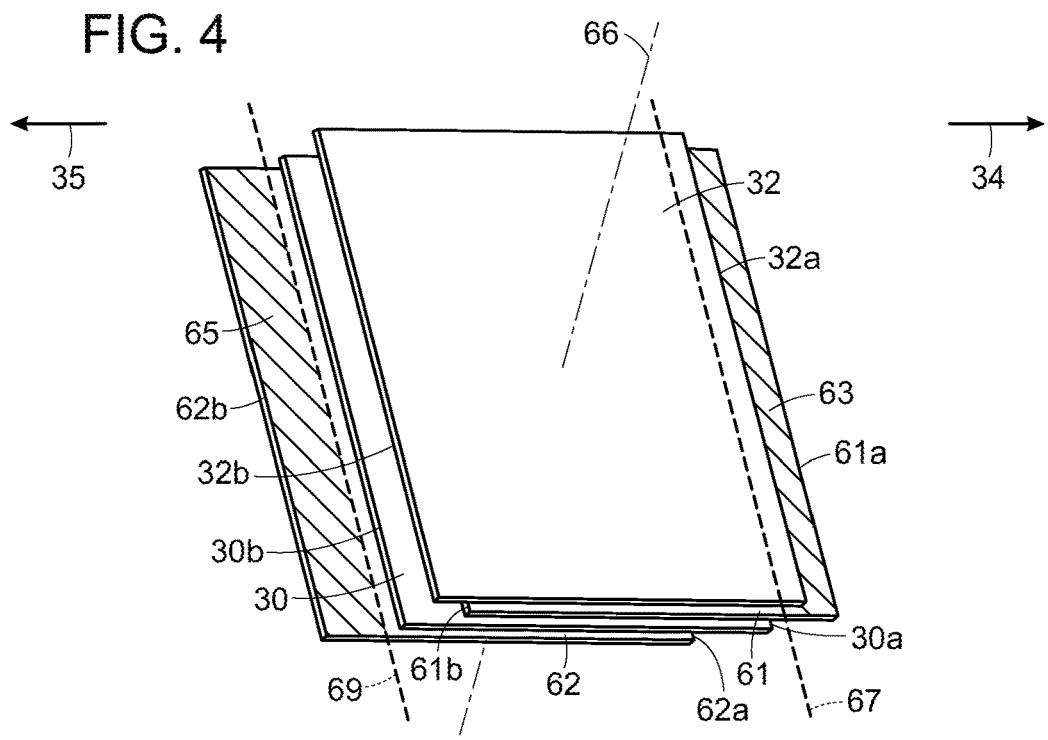
FIG. 4 is a perspective view of an electrode pair including a positive electrode plate, a negative electrode plate, and separator plates alternating with the positive and negative electrode plates.

Referring to FIGS. 3 and 4, the electrode assembly 60 is disposed in the cell housing 21 and includes a series of stacked positive electrode plates 61 alternating with negative electrode plates 62 and separated by intermediate separator plates 30, 32. The separator plates 30, 32 are each a permeable membrane that functions to keep the positive and negative electrodes 61, 62 apart to prevent electrical short circuits while also allowing passage of ionic charge carriers provided in the electrolyte and that are needed to close the circuit during the passage of current within the cell 20. The separator plates 30, 32 are formed of, for example, an electrically insulating material such as a tri-layer polypropylene-polyethylene-polypropylene membrane.

The series of stacked electrode plates 61, 62 and separator plates 30, 32 will be referred to herein as the "plate stack" 64, and a stack axis 66 of the plate stack 64 extends through a center of the plate stack 64 in a direction parallel to the stacking direction. When the electrode assembly 60 is disposed in the cell housing 21, the electrode plates 61, 62 are parallel to the cell housing first and second ends 22, 23 and the stack axis 66 extends in a direction perpendicular to the cell housing first and second ends 22, 23. The electrode plates 60, 61 are very thin (e.g., having a thickness on the order of about 0.095 to 0.145 mm) compared to the overall cell thickness (e.g. having a thickness on the order of tens or hundreds of mm) and thus are illustrated schematically in FIG. 3.

During stacking, the positive electrode plates 61, the negative electrode plates 62 and the separator plates 30, 32 that form the electrode assembly 60 are arranged in a layered or stacked configuration in the stacking direction. In the stacked configuration, the separator plates 30, 32, are stacked along the stack axis 66 such that peripheral edges of all the separator plates 30, 32 of the stack 64 are aligned in a direction parallel to the direction of the stack axis 66.

In addition, the positive and negative electrode plates 61, 62 are partially offset in a direction transverse to the stack axis (i.e., a length direction) relative to the respective separator plates 30, 32. In particular, the positive electrode plates 61 are stacked along the stack axis 66 such that peripheral edges of the positive electrode plates 61 are aligned with each other in a direction parallel to the direction of the stack axis 66 but are partially offset relative to the separator plates 30, 32 in a first direction parallel to the length direction. The first direction is represented in FIG. 4 by arrow 34. Thus, one edge 61a of each of the positive electrode plates 61 extends beyond a corresponding edge 30a. 32a of the separator plates 30, 32 resulting in a positive "clear lane" 63 of exposed conductive material.

The negative electrode plates 62 are stacked along the stack, axis 66 such that peripheral edges of the negative electrode plates 62 are aligned with each other in a direction parallel to the direction of the stack axis 66 but are partially offset relative to the separator plates 30, 32, in a second direction, where the second direction is parallel to the length direction and opposed to that of the first direction. The second direction is represented in FIG. 4 by arrow 35. Thus, one edge 62b of each of the negative electrode plates 62 extends beyond a corresponding edge 30b, 32b of the separator plates 30, 32 resulting in a negative "clear lane" 65 of exposed conductive material.

Figure 5:
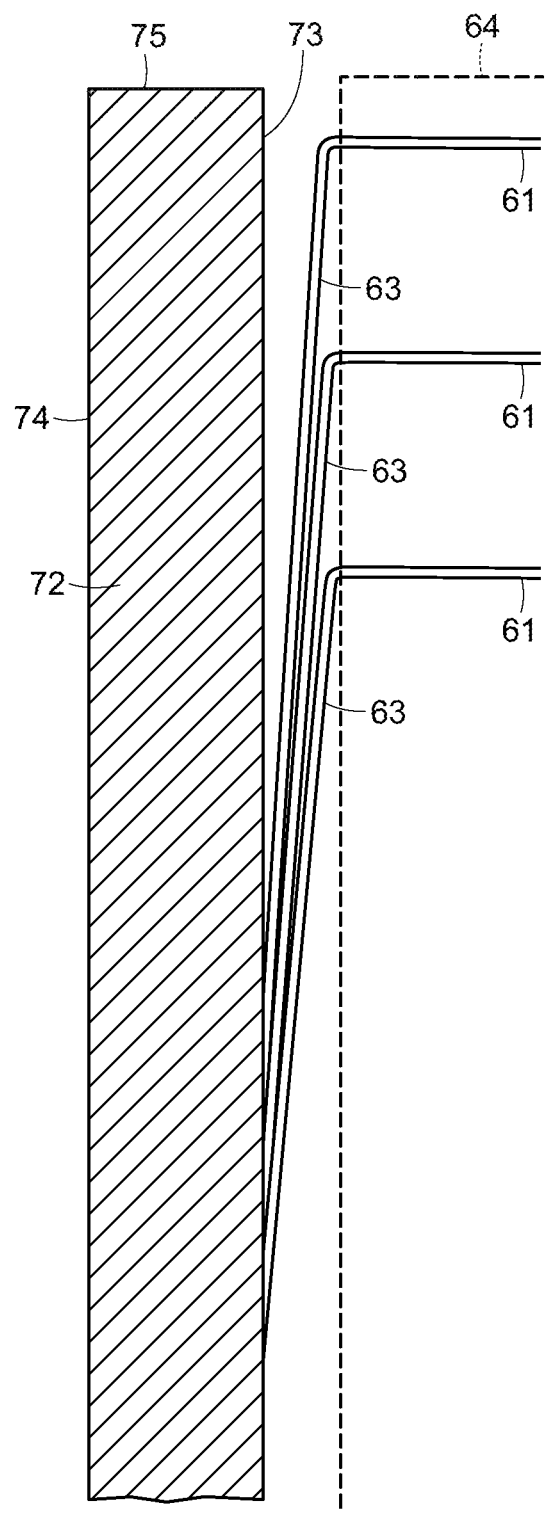
FIG. 5 is a cross-sectional view of a portion of the electrode plate stack illustrating the positive folded portions of the positive electrode plates arranged in an overlapped configuration and in electrical contact with a current collecting plate, with the negative electrode plates and separator plates omitted for clarity.
Figure 6:
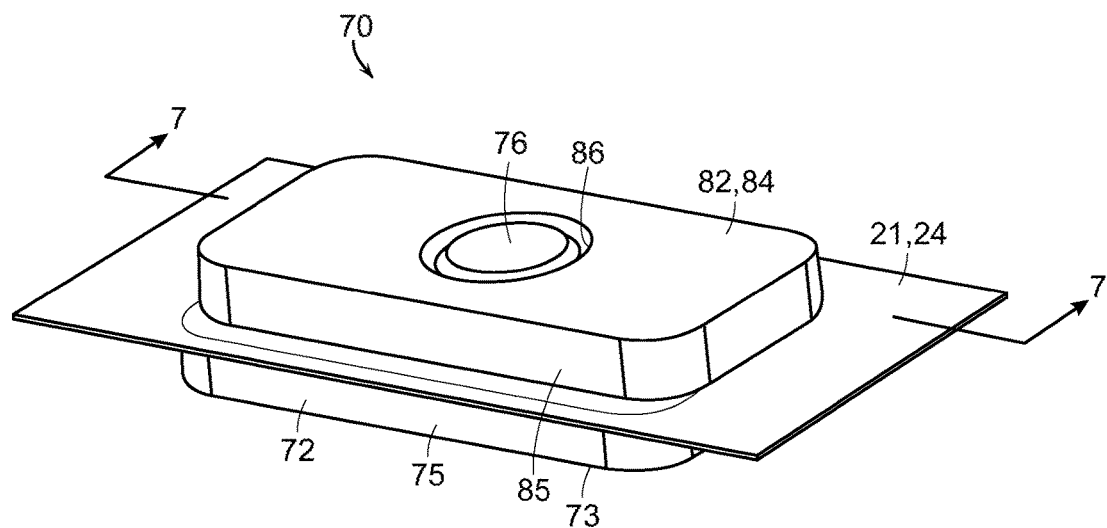
FIG. 6 is a perspective view of a current collector device assembled with the cell housing, where only a portion of a side of the cell housing is shown with the electrode assembly omitted for clarity.
Figure 7:
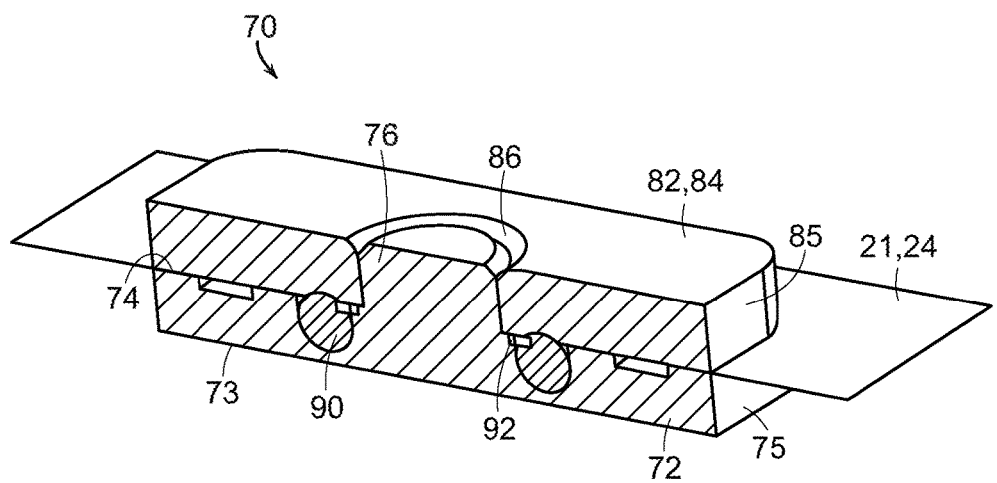
FIG. 7 is a cross-sectional view of the current collector device of FIG. 6 as seen across line 7-7 of FIG. 6.
Figure 8:
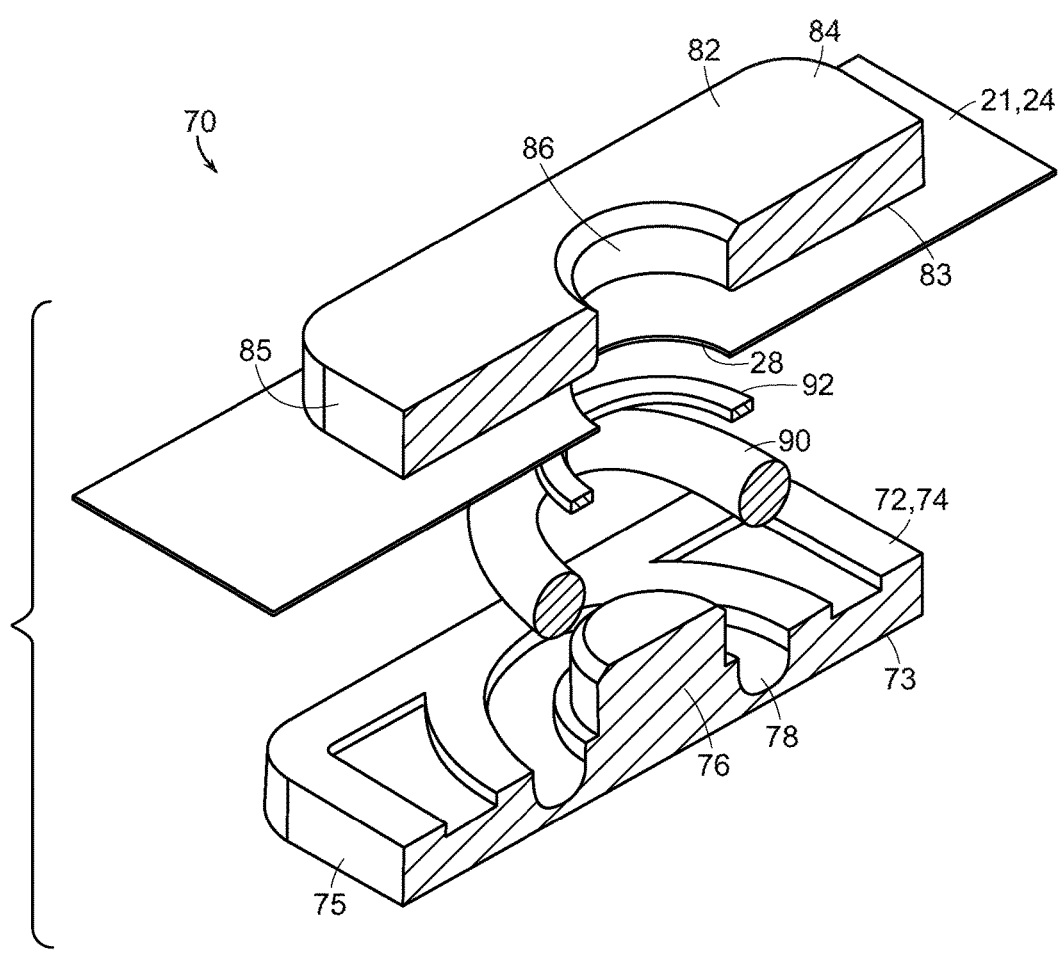
FIG. 8 is an exploded cross-sectional view of the current collector device of FIG. 6 as seen across line 7-7 of FIG. 6.

Referring to FIG. 5, the clear lane 63 of each positive electrode plate 61 may be folded against a side of the plate stack 64. Likewise, the clear lane 65 of each negative electrode plate 62 may be folded against the opposed side of the plate stack 64 (not shown). Due to the relative spacing of the electrode plates 61, 62 along the stack axis 66, the folded clear lanes 63, 65 form an overlapping louvered configuration in which a portion of each clear lane 63, 65 is exposed and faces a side (i.e., side 24) of the cell housing 21. The folded clear lanes on a given side of the plate stack 64 cooperate to form a generally planar electrically conductive surface that can be used to form an electrical connection with a current collection device 70, 71 as discussed further below.

Referring to FIGS. 2, and 6-8, each cell 20 also includes a first current collector device 70 and a second current collector device 71 that form a weld-free electrical connection with the plates 61, 62 of the plate stack 64. The first current collector device 70 is disposed at the first opening 28 and the second current collector device 71 is disposed at the second opening 29. The first current collector device 70 and the second current collector device 71 are identical, and thus only the first current collector device 70 will be described in detail. Elements common to both the first and second current collector devices 70, 71 will be referred to with common reference numbers.

The first current collector device 70 is a two-piece device that includes a current collecting plate 72 and a terminal plate 82. The current collecting plate 72 is a thin, electrically conductive plate that includes an electrode-facing surface 73, a side-facing surface 74 that is opposed to the electrode-facing surface 73, and a peripheral edge surface 75 that extends between the electrode-facing surface 73 and the side-facing surface 74. The peripheral edge surface 75 defines a rectangular shape to correspond to the rectangular shape of a side of the electrode stack 64.

The electrode-facing surface 73 is generally planar and free of surface features. The side-facing surface 74 includes a cylindrical protrusion 76. In the illustrated embodiment, the protrusion 76 has a circular cross-sectional shape, but is not limited to having this shape. The protrusion 76 is located in a central region of the side-facing surface 74, and protrudes toward the cell housing side 24.

The current collecting plate 72 is disposed between the housing first side 24 and the electrode assembly 60. In particular, the electrode-facing surface 73 directly contacts and forms an electrical connection with the folded clear lanes 63 of the positive electrode plates 61. The current collecting plate 72 is oriented so that the side-facing surface 74 is parallel to the housing first side 24 and overlies the first opening 28. In addition, the protrusion 76 is aligned with the first opening 28, and extends through the first opening 28. The cell housing 21 and the electrode assembly 60 are dimensioned so that the side-facing surface 74 of the collecting plate 72 abuts the inner surface of the housing first side 24 while the electrode-facing surface 73 is in contact with the folded clear lanes 63 of the positive electrode plates 61.

The terminal plate 82 is a thin, electrically conductive plate that includes a housing-facing surface 83, an outward-facing surface 84 that is opposed to the housing-facing surface 83, and a peripheral edge surface 85 that extends between the housing-facing surface 83 and the outward-facing surface 84. In the illustrated embodiment, the peripheral edge surface 85 defines a generally rectangular shape, but is not limited to a generally rectangular shape. The terminal plate 82 is formed having a centrally-located port 86 that extends between the housing-facing and the outward-facing surfaces 83, 84.

The terminal plate 82 is disposed outside the cell housing 21 and abuts the outer surface of the housing first side 24. In particular, the terminal plate 82 overlies the first opening 28 with the port 86 aligned with the first opening 28, and with the protrusion 76 extending through the port 86. The port 86 is shaped and dimensioned to correspond to the shape and dimensions of the protrusion 76 with a press-fit tolerance. As such, the the port 86 is configured to engage with the protrusion 76 in such a way that the port 86 directly contacts the protrusion 76 and forms an electrical connection with the current collecting plate 72. In addition, the mechanical connection (e.g., the press fit connection) between the protrusion 76 and the port 86 serves to retain the current collector device 70 in the assembled configuration within the opening 28.

A seal 90 is provided around the opening 28. The seal 90 may be a bead of sealing material that forms a hermetic seal around the opening 28 and prevent leakage of electrolyte from the cell housing 21 through the opening 28. The seal 90 is provided between the terminal plate housing-facing surface 83 and the housing first side 24. In the illustrated embodiment, the seal 90 resides in an annular groove 78 formed in the current collecting plate side-facing surface 74. The depth of the groove 78 is less than a diameter of the seal 90, so that when the seal resides within the groove 78 it protrudes outward relative to the current collecting plate side-facing surface 74. Optionally, a retaining ring 92 may be used to retain the seal 90 within the groove 78.

It is understood that the seal 90 could alternatively be provided between the current collecting plate side-facing surface 74 and the housing first side 24, or at both locations.

Advantageously, since the seal 90 is used at a location remote from the seal joint 40, it requires fewer specialized material properties. For this reason, the sealing material used to provide the seal 90 may be a commonly available material. The sealing material may be, for example, a pressure sensitive adhesive, a gasket material, or a pre-formed seal such as an O-ring. As a result, the sealing material may be low in cost relative to some sealing materials used in some conventional pouch cells to form a seal within the seal joint.

The mechanical connection (e.g., the press fit connection) between the protrusion 76 and the port 86 not only serves as a fastener that retains the elements of the current collector device 70 in an assembled configuration and having direct physical contact to produce an electrical connection therebetween, it also serves to compress the seal 90 between the side 24 and the current collecting plate 72. The compression force generated by the mechanical connection advantageously improves the reliability of the seal 90 relative to some through-wall current collector devices that do not have a mechanical connection that provides a compression force.

The second current collector device 71 is disposed at the second opening 29 (FIG. 3). The current collecting plate 72 of the second current collector device 71 is disposed between the housing third side 26 and the electrode assembly 60, and is oriented so that the side-facing surface 74 is parallel to the housing third side 26 and overlies the second opening 29, and so that the protrusion 76 extends through the second opening 29. In addition, the electrode-facing surface 73 of the second current collector device 71 directly contacts and forms an electrical connection with the folded clear lanes 65 of the negative electrode plates 62, while the side-facing surface 74 abuts an inner surface of the cell housing third side 26. In addition, the terminal plate 82 of the second current collector device 71 is disposed outside the cell housing 21 and abuts an outer surface of the housing third side 26 so as to overlie the second opening 29. The terminal plate 82 is oriented so that the housing-facing surface 83 is parallel to the housing third side 26, and faces the current collecting plate 72 through the second opening 29. In particular, the terminal plate 82 overlies the second opening 29 with the port 86 aligned with the second opening 29, and with the protrusion 76 extending through the port 86. As a result, a direct electrical connection is formed between the current collecting plate 72 and the terminal plate 82. In addition, a press-fit mechanical connection is formed between the protrusion 76 and the port 86 which applies a compression force to the seal 90 that surrounds the second opening 29.

Thus, in both the first current collector device 70 and the second current collector device 71, a direct electrical connection is formed between the current collecting plate 72 and the terminal plate 82 via direct contact between the protrusion 76 and the port 86. In particular, the electrical connection is a weld-free, direct electrical connection is formed within the openings 28, 29. Moreover, since the mechanical connection between the protrusion 76 and the port 86 serves to compress the seal 90 between the side 24 and the current collecting plate 72, there is no need to provide an external force in order to ensure that an electrical connection is formed between the facing surfaces 83, 74 of the terminal plate 82 and the current collecting plate 72.

Figure 9:
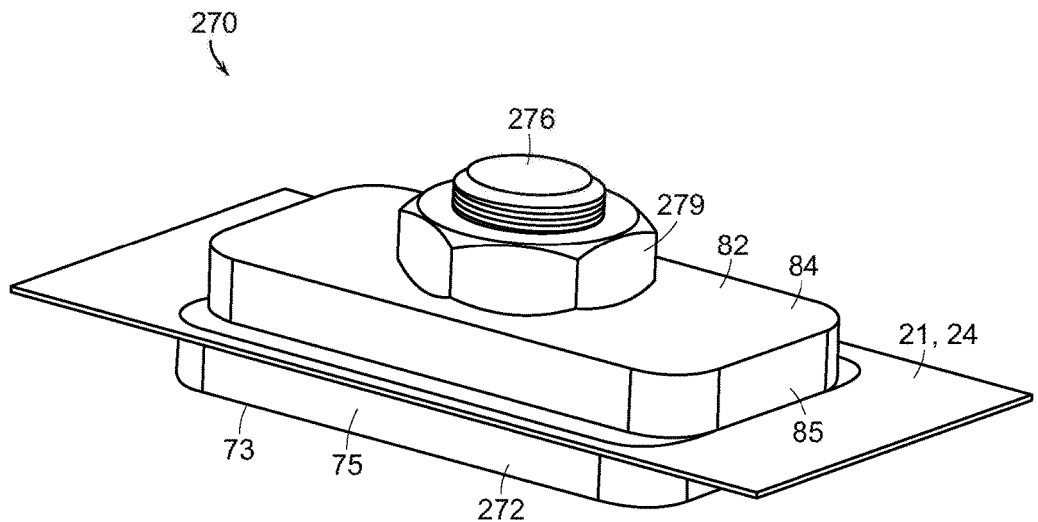
FIG. 9 is a perspective view of an alternative embodiment current collector device assembled with the cell housing, where only a portion of a side of the cell housing is shown with the electrode assembly omitted for clarity.
Figure 10:
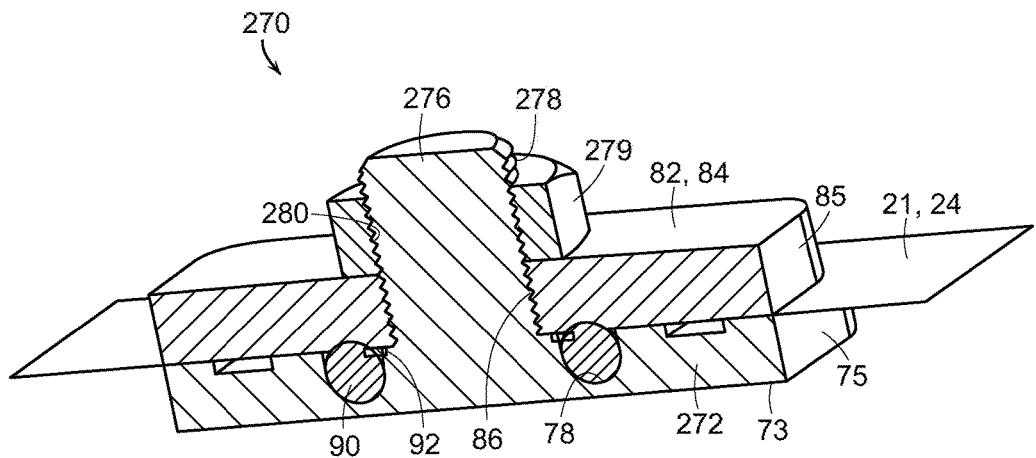
FIG. 10 is a cross-sectional view of the current collector device of FIG. 9 as seen across line 10-10 of FIG. 9.
Figure 11:
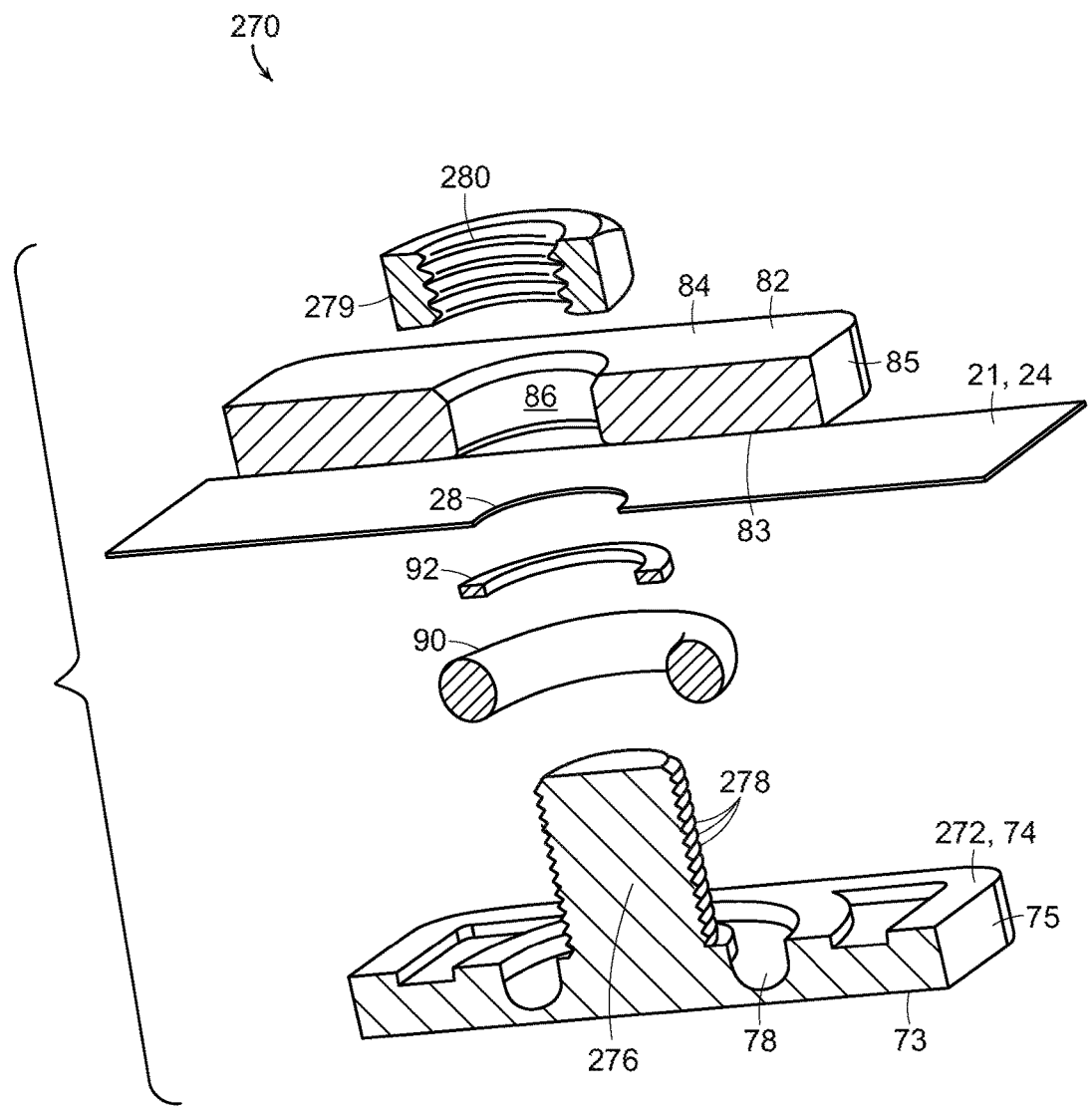
FIG. 11 is an exploded cross-sectional view of the current collector device of FIG. 9 as seen across line 10-10 of FIG. 9.

Referring to FIGS. 9-11, an alternative embodiment current collector device 270 is similar to the current collector device 70 described above with respect to FIGS. 6-8, and common elements are referred to using common reference numbers. The current collector device 270 includes the terminal plate 82 as described above with respect to FIGS. 6-8 and an alternative embodiment current collecting plate 272. The current collecting plate 272 includes a protrusion 276 that is formed on the side-facing surface 74. The protrusion 276 has a circular cross-sectional shape, and includes an external thread 279. The protrusion 76 is located in a central region of the side-facing surface 74, and protrudes toward the cell housing side 24. The protrusion 276 is provided at a location corresponding to the opening 28. In addition, the protrusion 276 is configured to protrude through the opening 28, directly contact the terminal plate port 86 and form an electrical connection with the terminal plate 82 via the port 86.

The current collector device further includes a nut 279 having an internal thread 280 that is shaped and dimensioned to engage the external thread of the protrusion 276. The nut 279 is disposed on the outward lacing surface 84 of the terminal plate 82 in engagement with the protrusion 276, and is tightened sufficiently to draw the side-facing surface 74 of the current collecting plate 272 toward the terminal plate 82, and to apply a compression force to the seal 90.

As in the earlier embodiments, the seal 90 is provided on the housing-facing surface 83 of the terminal plate 82 around the opening 28, 29 to form a hermetic seal and prevent leakage of electrolyte from the cell housing 21. Thus, the electrical connection between the terminal plate 82 and the current collecting plate 272 is a weld-free, direct electrical connection.

The mechanical connection between the current collecting plate protrusion 76, 276 and the terminal plate port 86 is not limited to the exemplary embodiments described above, and may be achieved using other fasteners and/or types of mechanical connections. For example, the mechanical joining method and/or devices may include use of a rivet, an E-ring, a C-ring, etc. In all cases, the mechanical connection between the current collecting plate protrusion 76, 276 and the terminal plate port 86 is made in such a way as to apply a slight compression force to the seal 90.

Figure 12:
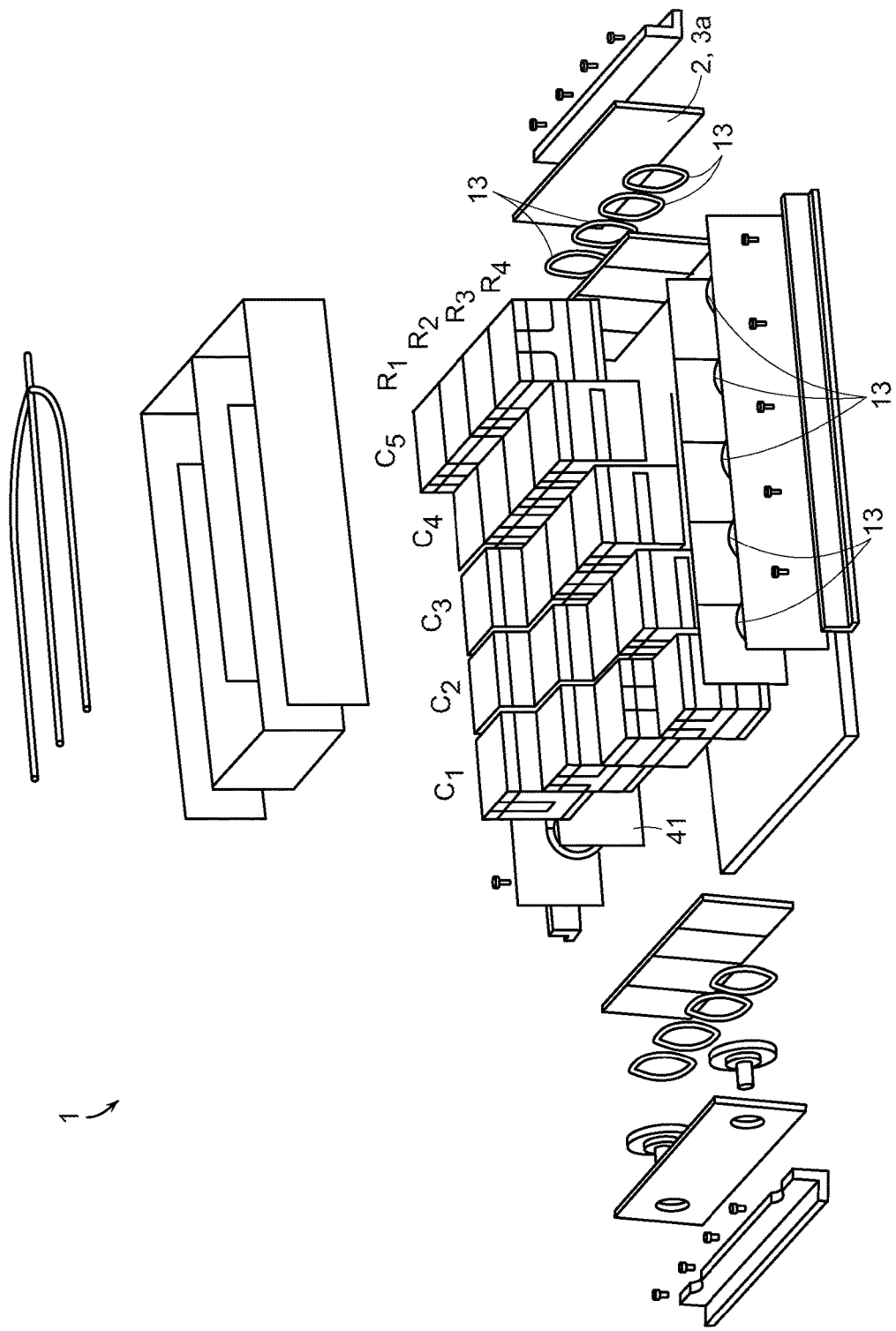
FIG. 12 a partially exploded perspective view of a battery pack including an array of pouch cells.

Referring now to FIG. 12, in some embodiments a force F may be applied to the cells 20 of the battery pack to provide direct contact and an electrical connection between the terminal plates 82a, 82b of adjacent cells 20a, 20b. In some embodiments, the force F may be generated externally with respect to the cell housing 20. FIG. 12 illustrates the battery pack 1 including an array of cells 20 arranged in rows R1, R2, R3, R4 and columns C1, C2, C3, C4, C5 within the battery pack housing 2. The electrical connection between the terminal plates 82a, 82b of adjacent cells 20a, 20b is generated and/or assured by urging the cells 20 of a row together and the cells 20 of a column together. Specifically, a compression force along the cell rows is achieved by providing an elastic member 13 between the cells 20 of the row and the sidewall 3a of the container portion 3 of the battery pack housing 2. For example, an elastic member such as the wave spring 13 can be disposed at one or both ends of each row R1, R2, R3, R4 to ensure an electrical connection between the terminal plates 82a, 82b of adjacent cells 20a, 20b. Similarly, a wave spring 13 can be disposed at one or both ends of each column C1, C2, C3, C4, C5 to ensure an electrical connection between the terminal plates 82a, 82b of adjacent cells 20a, 20b.

In some embodiments, the current collecting plate 72 and the terminal plate 82 of the first collector device 70 are formed of, or plated with, a first electrically conductive material that corresponds to the material used to form the positive electrode plates 61, such as aluminum. In addition, the current collecting plate 72 and the terminal plate 82 of the second collector device 71 are formed of, or plated with, a second electrically conductive material that corresponds to the material used to form the negative electrode plates 62, such as copper.

Figure 13:
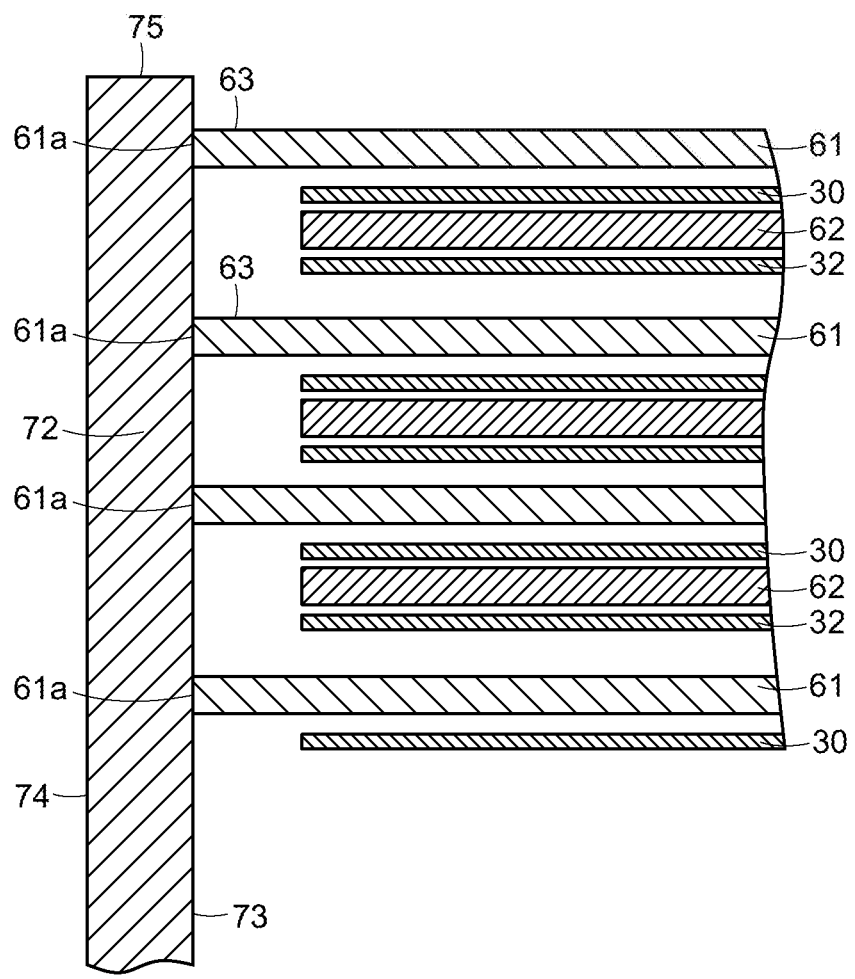
FIG. 13 is a partial cross sectional view of an alternative embodiment electrode stack.

Referring to FIG. 13, although the current collecting plate 72 of the first current collecting device 70 and the second current collecting device 71 are described above as being pressed against a folded portion (e.g., the clear lane 63, 65) of the corresponding positive or negative electrode plate 61, 62 to form the weld-free electrical connection, other connection configurations may be employed to form the weld-free electrical connection. For example, the current collecting plate 72 of the first current collecting device 70 may be electrically connected via direct contact to peripheral edges 61a of non-folded positive electrode plates 61. Similarly, the current collecting plate 72 of the second current collecting device 71 may be electrically connected via direct contact to the peripheral edges 62b of non-folded negative electrode plates 62. Thus, the first and second current collector devices 70, 71 may form a direct electrical connection with edge surfaces of the electrode plates 61, 62 via a weld-free pressure contact.

Although the embodiments described above illustrate that the current collecting plate 72, 272 includes the protrusion 76, 276 and the terminal plate 82 includes the port 86, it is understood that in some alternative embodiments, the current collecting plate 72, 272 may include the port and the terminal plate 82 may include the protrusion that is received in the port.

Referring to FIGS. 14-16, in the illustrated embodiments, the cell housing 21 is described as having the first opening 28 that is formed in one of the sides and the second opening 29 that is formed in a side that is opposed to the one side (FIG. 14). However, the cell housing 21 is not limited to this configuration. For example, in some embodiments, the cell housing 21 may include the first opening 28 that is formed in one of the sides and the second opening 29 that is formed in side that is adjacent to the one side (FIG. 15). In other embodiments, the cell housing 21 may include the first opening 28 that is formed in one of the sides and the second opening 29 that is formed in the same side (FIG. 16). In still other embodiments, the cell housing 21 may include two first openings 28 where one first opening 28 is disposed on each of opposed sides, and two second openings 29 where one second opening is disposed on each of the sides adjacent to the opposed sides.

Although the electrode assembly 60 is described herein as being a "stacked" electrode assembly that includes a series of stacked plates 61, 62, the electrode assembly 60 is not limited to this configuration. For example, in some embodiments, the electrode assembly 60 may include a rolled electrode assembly (e.g., a jelly roll assembly), a folded electrode assembly (i.e., a Z-fold assembly), or other electrode arrangement.

In the illustrated embodiment, the pouch-type cell housing 21 is an assembly of two blanks of a metal laminated polymer film sheet, where each blank is folded to form the shape of an open-ended box. However, the pouch-type cell housing is not limited to this construction. For example, in some embodiments, the pouch-type cell housing may be formed of a sheet of a metal laminated polymer film that is drawn to form a recess that receives the electrode assembly, and folded and sealed to form a closed pouch.

Although the cell 20 has a cube-shaped cell housing 21, the cell housing 21 is not limited to a cube shape. For example, the cell housing 21 may be rectangular in shape (FIG. 4). In another example, the cell housing 21 may have other polygonal shapes that permit close packing such as an eight surface structure having hexagonally arranged sides (not shown).

In some embodiments, the cells 20 do not have a pouch-type cell housing, and instead have an alternative type cell housing. In one example, the cells 20 may have a rigid plastic housing. In another example, the cells 20 may have a metal housing such as a metal prismatic housing. In this case, the metal housing may be electrically isolated from the electrode assembly and the current collecting devices 70, 71.

Moreover, the cells 20 are not limited to being a lithium-ion battery. For example, the cells 20 may be aluminum-ion, alkaline, nickel-cadmium, nickel metal hydride, or other type of cell.

Selective illustrative embodiments of the battery system including the cell are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery system and battery cell have been described above, the battery system and/or battery cell are not limited to the working examples described above, but various design alterations may be carried out without departing from the devices as set forth in the claims.

What is claimed is:

1. An electrochemical cell including a cell housing, an electrode assembly disposed in the cell housing, and a current collector device, wherein
the cell housing is formed of a flexible sheet, the cell housing having a first housing portion, and a second housing portion that is joined to the first housing portion along a sealed joint to form a pouch, the first housing portion comprising a base and a sidewall that protrudes from a perimeter of the base and surrounds the base to form an open-ended container,
the electrode assembly includes positive electrode portions alternating with negative electrode portions, the positive electrode portions and the negative electrode portions being separated by at least one separator and stacked along a stack axis, the stack axis extending in a direction perpendicular to the base, and
the current collector device is electrically connected to one of the positive electrode portions and the negative electrode portions and exits the cell housing via an opening formed in the cell housing sidewall, the opening disposed at a location spaced apart from the sealed joint and at a location facing the stack axis, the current collector device including
a current collecting plate that is disposed between the sidewall and the one of the positive electrode portions and the negative electrode portions, is electrically connected to the one of the positive electrode portions and the negative electrode portions, is oriented parallel to the sidewall, and overlies the opening, the current collecting plate including a protrusion that protrudes from a sidewall facing surface of the plate and extends through the opening,
a seal that surrounds the opening and is disposed between the sidewall and the current collecting plate, and
a terminal plate that is oriented parallel to the sidewall, overlies the opening and is disposed outside the cell housing, the terminal plate including a port that overlies the opening and receives the protrusion, and the port is configured to engage with the protrusion in such a way that the port of the terminal plate directly contacts the protrusion of the current collecting plate so as to form an electrical connection with the current collecting plate, and in such a way that the seal is compressed between the sidewall and the current collecting plate.

2. The electrochemical cell of claim 1, wherein the protrusion extends through the seal, the opening and the port, and a fastener is disposed on a terminal end of the protrusion in such a way as to retain the protrusion within the port.

3. The electrochemical cell of claim 1, wherein an outer surface of the protrusion is threaded, and the current collector device comprises a nut that is disposed on a terminal end of the protrusion, internal threads of the nut engaging with the threads on the protrusion outer surface, the nut cooperating with the protrusion in such a way as to generate a compression force on the seal.

4. The electrochemical cell of claim 1, wherein an outer surface of the protrusion has a shape and dimension that allows the protrusion to engage with the port in a press fit.

5. The electrochemical cell of claim 1, further comprising a second current collector that is electrically connected to another one of the positive electrode portions and the negative electrode portions and exits the cell housing via a second opening formed in the cell housing.

6. The electrochemical cell of claim 5, wherein
the cell housing is rectangular including a first end, an opposed second end, and four sides that extend between the first end and the second end, and
the first opening is formed in one of the four sides, and the second opening is formed in another of the four sides.

7. The electrochemical cell of claim 6, wherein the first opening is formed in one of the four sides, and the second opening is formed in a side opposed to the one of the four sides.

8. The electrochemical cell of claim 6, wherein the first opening is formed in one of the four sides, and the second opening is formed in a side adjacent to the one of the four sides.

9. The electrochemical cell of claim 5, wherein
the cell housing is rectangular including a first end, an opposed second end, and four sides that extend between the first end and the second end, and
the first opening is formed in one of the four sides, and the second opening is formed in the same side.

10. The electrochemical cell of claim 1, wherein each of the terminal plate and the current collecting plate comprise a first side and an opposed second side, and each of the first side and the second side is generally planar and free of surface features.

11. A battery pack comprising electrochemical cells, each electrochemical cell including a cell housing, an electrode assembly disposed in the cell housing, and a current collector device, wherein
the cell housing is formed of a flexible sheet, the cell housing having a first housing portion, and a second housing portion that is joined to the first housing portion along a sealed joint to form a pouch, the first housing portion comprising a base and a sidewall that protrudes from a perimeter of the base and surrounds the base to form an open-ended container,
the electrode assembly includes positive electrode portions alternating with negative electrode portions, the positive electrode portions and the negative electrode portions being separated by at least one separator and stacked along a stack axis, the stack axis extending in a direction perpendicular to the base, and
the current collector device is electrically connected to one of the positive electrode portions and the negative electrode portions and exits the cell housing via an opening formed in the cell housing sidewall, the opening disposed at a location spaced apart from the sealed joint and at a location facing the stack axis, the current collector device including
a current collecting plate that is disposed between the sidewall and the one of the positive electrode portions and the negative electrode portions, is electrically connected to the one of the positive electrode portions and the negative electrode portions, is oriented parallel to the sidewall, and overlies the opening, the current collecting plate including a protrusion that protrudes from a sidewall facing surface of the plate and extends through the opening,
a seal that surrounds the opening and is disposed between the sidewall and the current collecting plate, and
a terminal plate that is oriented parallel to the sidewall, overlies the opening and is disposed outside the cell housing, the terminal plate including a port that overlies the opening and receives the protrusion, and the port is configured to engage with the protrusion in such a way that the port of the terminal plate directly contacts the protrusion of the current collecting plate so as to form an electrical connection with the current collecting plate, and in such a way that the seal is compressed between the sidewall and the current collecting plate, and
a portion of the current collector device of one of the electrochemical cells directly contacts and forms an electrical connection with a portion of a current collector device of an adjacent electrochemical cell.

12. The battery pack of claim 11, wherein the protrusion extends through the seal, the opening and the port, and a fastener is disposed on a terminal end of the protrusion in such a way as to retain the protrusion within the port.

13. The battery pack of claim 11, wherein an outer surface of the protrusion is threaded, and the current collector device comprises a nut that is disposed on a terminal end of the protrusion, internal threads of the nut engaging with the threads on the protrusion outer surface, the nut cooperating with the protrusion in such a way as to generate a compression force on the seal.

14. The battery pack of claim 11, wherein an outer surface of the protrusion has a shape and dimension that allows the protrusion to engage with the port in a press fit.

15. The battery pack of claim 11, further comprising a second current collector that is electrically connected to another one of the positive electrode portions and the negative electrode portions and exits the cell housing via a second opening formed in the cell housing.

16. The battery pack of claim 15, wherein
the cell housing is rectangular including a first end, an opposed second end, and four sides that extend between the first end and the second end, and
the first opening is formed in one of the four sides, and the second opening is formed in another of the four sides.

17. The battery pack of claim 16, wherein the first opening is formed in one of the four sides, and the second opening is formed in a side opposed to the one of the four sides.

18. The battery pack of claim 16, wherein the first opening is formed in one of the four sides, and the second opening is formed in a side adjacent to the one of the four sides.

19. The battery pack of claim 15, wherein
the cell housing is rectangular including a first end, an opposed second end, and four sides that extend between the first end and the second end, and
the first opening is formed in one of the four sides, and the second opening is formed in the same side.

20. The battery pack of claim 11, wherein each of the terminal plate and the current collecting plate comprise a first side and an opposed second side, and each of the first side and the second side is generally planar and free of surface features.

* * * * *